(12) United States Patent
DiFoggio et al.

(10) Patent No.: US 9,207,354 B2
(45) Date of Patent: Dec. 8, 2015

(54) APPARATUS AND METHOD FOR ESTIMATING CHARACTERISTICS OF A SENSOR CONTAINING INTERFEROMETER

(71) Applicants: Rocco DiFoggio, Houston, TX (US); Carl Edwards, Katy, TX (US)

(72) Inventors: Rocco DiFoggio, Houston, TX (US); Carl Edwards, Katy, TX (US)

(73) Assignee: Baker Hughes Incorporated, Houston, TX (US)

(*) Notice: Subject to any disclaimer, the term of this patent is extended or adjusted under 35 U.S.C. 154(b) by 390 days.

(21) Appl. No.: 13/724,870

(22) Filed: Dec. 21, 2012

(65) Prior Publication Data

US 2014/0174147 A1 Jun. 26, 2014

(51) Int. Cl.
*G01P 21/02* (2006.01)
*G01V 13/00* (2006.01)

(52) U.S. Cl.
CPC .................................... *G01V 13/00* (2013.01)

(58) Field of Classification Search
CPC ................................................... G01V 13/00
USPC ......... 73/1.37, 1.41, 1.85; 356/454, 506, 519; 702/90, 105
See application file for complete search history.

(56) References Cited

U.S. PATENT DOCUMENTS

| | | | |
|---|---|---|---|
| 6,176,323 B1 | 1/2001 | Weirich et al. | |
| 6,437,326 B1 | 8/2002 | Yamate et al. | |
| 6,763,718 B1 * | 7/2004 | Waters et al. | 73/514.26 |
| 7,782,460 B2 | 8/2010 | DiFoggio et al. | |
| 2003/0137672 A1 * | 7/2003 | Moriya et al. | 356/519 |
| 2005/0269499 A1 | 12/2005 | Jones et al. | |
| 2006/0139646 A1 | 6/2006 | DiFoggio | |
| 2012/0212745 A1 | 8/2012 | Edwards et al. | |

OTHER PUBLICATIONS

Garside, D. H. et al.; "Refractive index and Lorentz-Lorenz function of xenon liquid and vapour," J. Phys. B. (Proc. Phys. Soc.), 1968, Ser. 2, vol. 1, pp. 449-457.
PCT International Search Report and Written Opinion; International Application No. PCT/US2013/075689; International Filing Date: Dec. 17, 2013; Date of Mailing: Apr. 15, 2014, pp. 1-10.

* cited by examiner

*Primary Examiner* — Hezron E Williams
*Assistant Examiner* — Truong Phan
(74) *Attorney, Agent, or Firm* — Cantor Colburn LLP

(57) ABSTRACT

In one aspect, an apparatus for estimating a characteristic of a sensor is disclosed that in one embodiment may include a chamber housing sensor, wherein the sensor includes a suspended movable force mass having an opening therethrough, a first partially reflective member that moves with the force mass and a second partially reflective member spaced from the first partially reflective member, a source of buoyant fluid configured to supply the buoyant fluid to the chamber at a plurality of pressures, a device for directing light to the first and second partially reflective members at a plurality of angles, a detector for providing signals corresponding to light passing through the second partially reflective member corresponding to each of the plurality of angles and each of the plurality of pressures, and a processor for determining the characteristic of the sensor from the signals provided by the detector.

20 Claims, 5 Drawing Sheets

US 9,207,354 B2

APPARATUS AND METHOD FOR ESTIMATING CHARACTERISTICS OF A SENSOR CONTAINING INTERFEROMETER

BACKGROUND OF THE DISCLOSURE

1. Field of the Disclosure

The present disclosure relates generally to apparatus and methods for estimating characteristics or properties of sensors that include an interferometer, calibrating such sensors utilizing the estimated characteristics and such calibrated sensors wellbores for production of hydrocarbons.

2. Description of the Related Art

During both drilling of a wellbore and after drilling a wellbore, a variety of sensors are utilized for determining downhole parameters, including, but not limited to, gravity and acceleration. Gravimeters and accelerometers are often used to make such measurements. Some gravimeters and accelerometers utilize an interferometer that includes a proof mass and parallel partially reflective glass plates. Employing high precision gravimeters and accelerometers in in downhole applications improves accuracy of measurements. Some such sensors utilize interferometers that include a pair of parallel spaced apart partially reflective glass plates to generate optical interference. One way to increase the accuracy of such sensors is to accurately determine the distance between these partially reflective glass plates in wavelengths of light for precision calibration of such sensors. Mechanical measurements are generally are not accurate for precision calibration of such sensors. In some downhole application, it is desirable to have gravimeters that can provide highly accurate measurements over a wide range compared to traditional gravimeters, such as a gravity range between 1 g and 0.96 g. Other useful characteristics of interferometer-based sensors for use in making accurate interferometer-based sensors may include estimation of fringes of the interferometer at various angles of an incident light and the distances between peaks of such fringes.

The disclosure herein provides apparatus and methods for estimating certain characteristics of sensors that utilize optical interferometers, calibrating such sensors and utilizing such calibrated sensors in downhole applications.

SUMMARY

In one aspect, an apparatus for estimating a characteristic of a sensor is disclosed that in one embodiment may include a chamber housing the sensor, wherein the sensor includes a suspended movable force mass having an opening therethrough, a first partially reflective member that moves with the force mass and a second partially reflective member spaced from the first partially reflective member, a source of buoyant fluid configured to supply the buoyant fluid into the chamber at a plurality of pressures, a device for directing light to the first and second partially reflective members at a plurality of angles, a detector for providing signals corresponding to the light passing through the second partially reflective member corresponding to each of the plurality of angles and each of the plurality of pressures, and a processor for determining the characteristic of the sensor from the signals provided by the detector.

In another aspect, a method for estimating a characteristic of a sensor is disclosed that in one embodiment may include: housing the sensor in a chamber, wherein the sensor includes a suspended movable force mass having an opening therethrough, a first partially reflective member that moves with the force mass and a second partially reflective member spaced from the first partially reflective member; supplying a buoyant fluid at a plurality of pressures into the chamber to reduce effective gravity of the proof mass; directing light to the first partially reflective member and second partially reflective member at a plurality of angles; providing signals corresponding to light passing through the second partially reflective member and corresponding to the plurality of angles and plurality of pressures; and determining from the signals the characteristic of the sensor.

Examples of certain features of the apparatus and methods disclosed herein are summarized rather broadly in order that the detailed description thereof that follows may be better understood. There are, of course, additional features of the apparatus and methods disclosed hereinafter that will form the subject of the claims.

BRIEF DESCRIPTION OF THE DRAWINGS

For detailed understanding of the present disclosure, references should be made to the following detailed description, taken in conjunction with the accompanying drawings, in which like elements have generally been given like numerals and wherein.

DESCRIPTION OF THE DISCLOSURE

Figure 1:
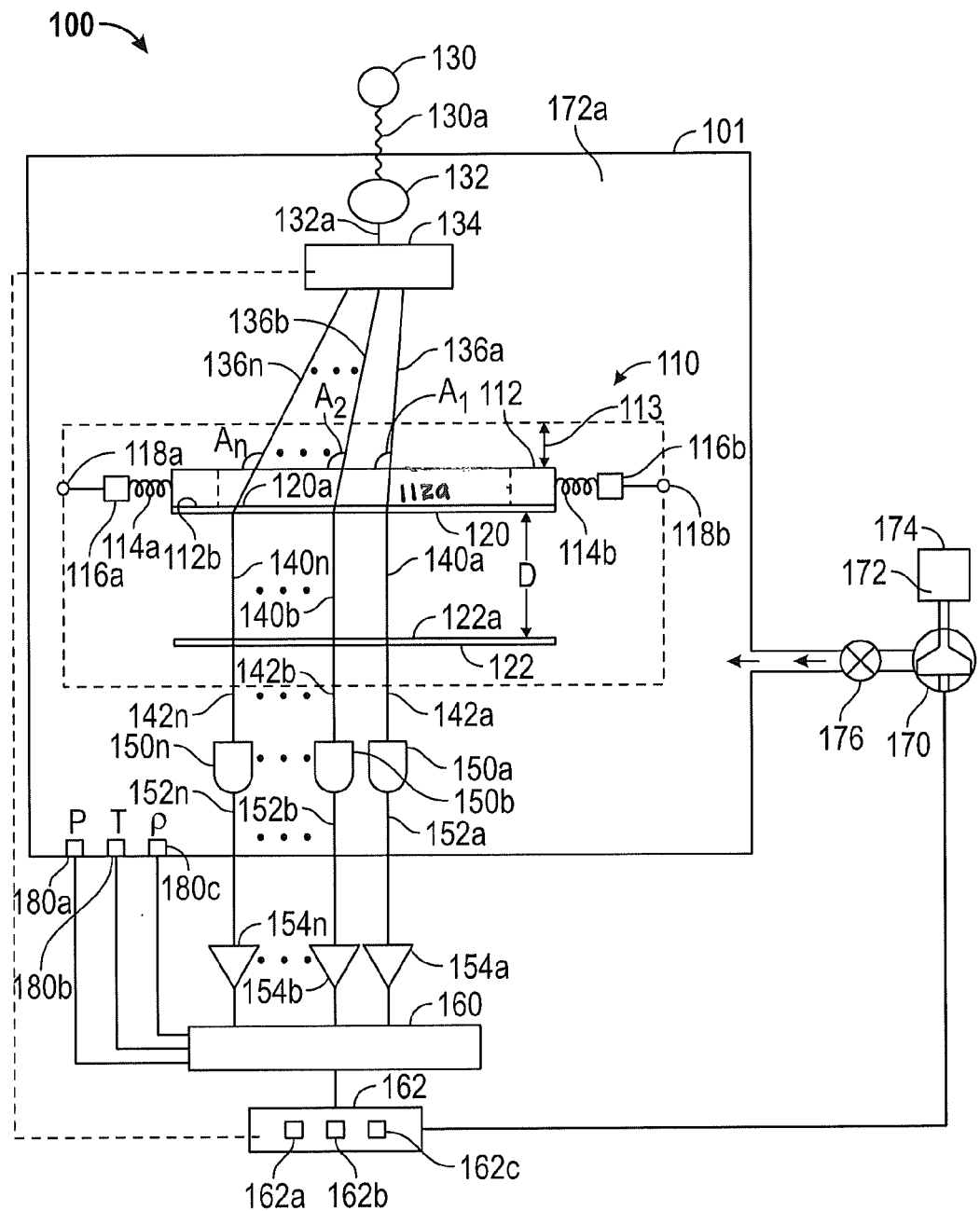
FIG. 1 is a schematic diagram of an exemplary apparatus for estimating one or more characteristics of a sensor that includes Fabry-Perot interferometer.

FIG. 1 is a schematic diagram of an exemplary system 100 for estimating one or more characteristics of a sensor that includes a Fabry-Perot interferometer and for calibrating such a sensor utilizing the estimated characteristics. The system 100 shows a sensor 110 placed in a sealed chamber 101. The sensor 110 includes a proof mass 112, such as one made from titanium or another suitable material. The proof mass 112 has a through opening 112a that allows light to pass through the proof mass opening 112a. The proof mass 112 is suspended by coils 114a, 114b, etc. and anchors 116a, 116b, 118a and 118b. The proof mass 112 may also be suspended by any other suitable mechanism. In such a configuration, the proof mass 112 is movable in the direction shown by arrows 113. A partially optically reflective member 120 moves with the proof mass 112. In one configuration, the member 120 may be a glass plate with a partially reflective surface 120a facing away from the proof mass 112. In one aspect, the member 120 may be attached to the proof mass bottom 112b so that the member 120 will move with the proof mass 112. A second partially reflective member 122 is placed spaced apart from the member 120. Member 122 may be a glass plate having a partially reflective surface 122a that faces the partially reflective surface 120a of member 120.

The system 100 further includes a light source 130 that directs a light beam 130a toward a lens 132 that focuses the light 130 into a focused light beam 132a. The focused light beam 132a is directed to the partially reflective member 120 by a rotating device 134. The device 134 sequentially directs light beam 132a at a plurality of angles A1, A2 ... An as light beams 136a, 136b ... 136n respectively. Each of the light beams 136a, 136b ... 136n undergoes multiple reflections between the partially reflective members 120 and 122. For example light beam 136a directed at angle A1 reflects multiple times between the surfaces 120a and 122a as shown by reflections 140a. Similarly, light beams 136a through 136n undergo multiple reflections as shown by reflections 140b and 140n respectively. Each time a light beam reflects between the surfaces 120a and 122a, a part of that light passes through the member 122, resulting in multiple offset beams which can interfere with each other. The large number of such interfering rays produces an interferometer with high resolution. The light beams 142a, 142b ... 142n corresponding to reflections 140a, 140b ... 140n are directed to a separate photo detector 150a, 150b ... 150n. Each such photo detector produces signals (current), such as signals 152a, 152b ... 152n, each of which is proportional to the light received by its corresponding photo-detector. The signals 152a, 152b ... 152n are respectively amplified by pre-amplifiers 154a, 154b ... 154n. A circuit 160 is provided to further process the amplified signals. A controller 162 processes the signals received from the circuit 160 to estimate one or more characteristics or parameters of the sensor 110, as described later. In one aspect, the controller 162 may be a computer-based device having a processor 162a, a storage device 162b, such as a digital memory device, and programmed instructions 162c accessible to the processor 162a for executing programmed instructions 162 contained therein and for estimating the characteristics of the sensor 110.

Still referring to FIG. 1, the system 100 further includes a buoyant gas supply unit that includes a pump 170 that supplies under pressure a buoyant gas 172 from a source 174 thereof to the chamber 101 via a flow control device 176, such as a valve. In one aspect, controller 162 may control the operation of the pump 170 and valve 176 to controllably supply the buoyant gas 172 to the chamber 101. When gas 172 is supplied to the chamber 101, it surrounds the sensor 110 and thus the proof mass. As the pressure of the gas 172a inside the chamber 170 increases, the density of the gas 172a in the chamber 170 increases, which pushes the proof mass 112 upward, thereby decreasing the effective gravity of the proof mass 112. A pressure sensor 180a, a temperature sensor 180b and a density sensor 180c may be provided to determine the pressure, temperature and density of the gas 172a in the chamber 101. Controller 162 may be utilized to process signals from sensors 180a, 180b and 180c to determine pressure, temperature and density of the gas.

Figure 2:
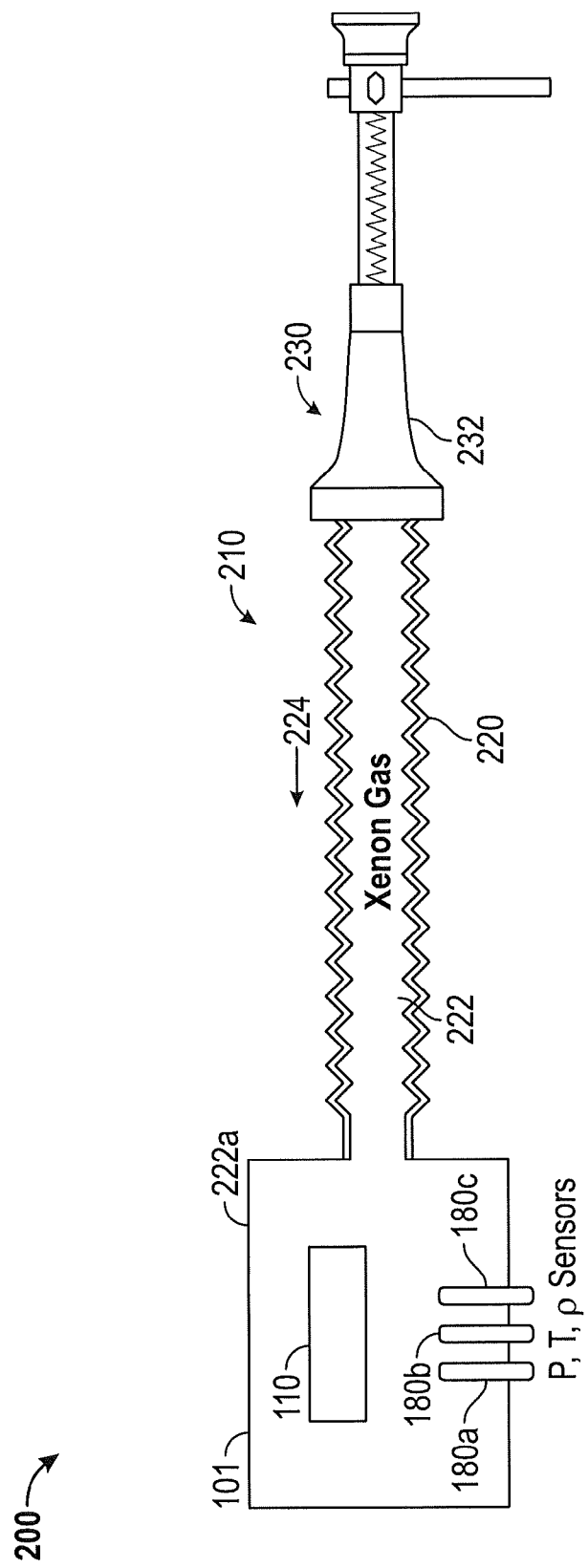
FIG. 2 is a schematic diagram of the exemplary apparatus shown in FIG. 1 utilizing an alternative manner for supplying a buoyant gas to the sensor.

FIG. 2 is a schematic diagram of a system 200 that is the same as system 200 shown in FIG. 1, except that system 200 utilizes an alternative buoyant gas supply device 210. For ease of explanation, most of the components already described in reference to system 100 in FIG. 1 are not shown in FIG. 2. In one aspect, the gas supply unit 210 may include bellows 220 filled with a suitable gas 222, such as xenon. Xenon is an atomic gas and it is the heaviest (131.29 AMU) inert gas in the periodic table that also has a stable nucleus that does not emit radiation. It is also inert and thus does not corrode the gravimeter components or deposits thereon that could alter the gravimeter readings. A chemically inert molecular gas such as perfluorodecalin (C10F18, 462.08 AMU) or perfluoro-N-Heptane (C7F16. 388.05 AMU) may also be used but such a gas may need to be heated to maintain it in the vapor phase with no liquid condensation. Empirical equations derived for density [g/cc] of xenon in terms of its pressure [psi] and temperature [C], which accounts for small variations from the ideal gas law, namely Rho(P,T)=1.48E-02+ 4.11E-11*P^3−2.39E-04*T−5.18E-03*(P/T)+4.79E-09*T^3+2.39E-04*(P/T)^2−1.32E-06*(P*T)+4.98E-04*P.

At 700 psi (48 bar), xenon's density is 0.39 g/cc, which reduces the effective acceleration of a tungsten (19.2 g/cc) proof mass immersed in xenon to 0.96 g, a desired calibration range. The buoyant gas may be used to determine the order of fringes associated with different angles and to determine an equation relating each angle's fringe function to the first angles fringe function. The increase in refractive index of the xenon with pressure, changes the optical path for all angles at that pressure by the same factor, therefore it does not change the equation relating one fringe function to the next. To supply gas 222 under pressure to the chamber 101, the bellows 220 may be compressed in the direction 224 toward the chamber 101. Compressing the bellows causes gas 222 to enter chamber 101 under pressure. In one aspect, the bellows 220 may be compressed by a mechanical device 230 that includes a screw jack 232a. Any other mechanism for supplying fluid under pressure to the chamber 101 may be utilized, including, but not limited to, a chamber containing the fluid 222 and a piston for moving the fluid out of the chamber. Sensors 180a, 180b and 180c provide measurements for pressure, temperature and density of the gas 222 in the chamber 101. To estimate a characteristic of the sensor 110, light 130a from the source 130 is directed to the member 112 at a first angle A1 and the pressure of the gas increased continuously or incrementally. The current output from the photodiode 150a is measured as a function of the pressure of the gas in the chamber 101. This process is repeated for multiple angles, such as angles A2 through An.

Figure 3:
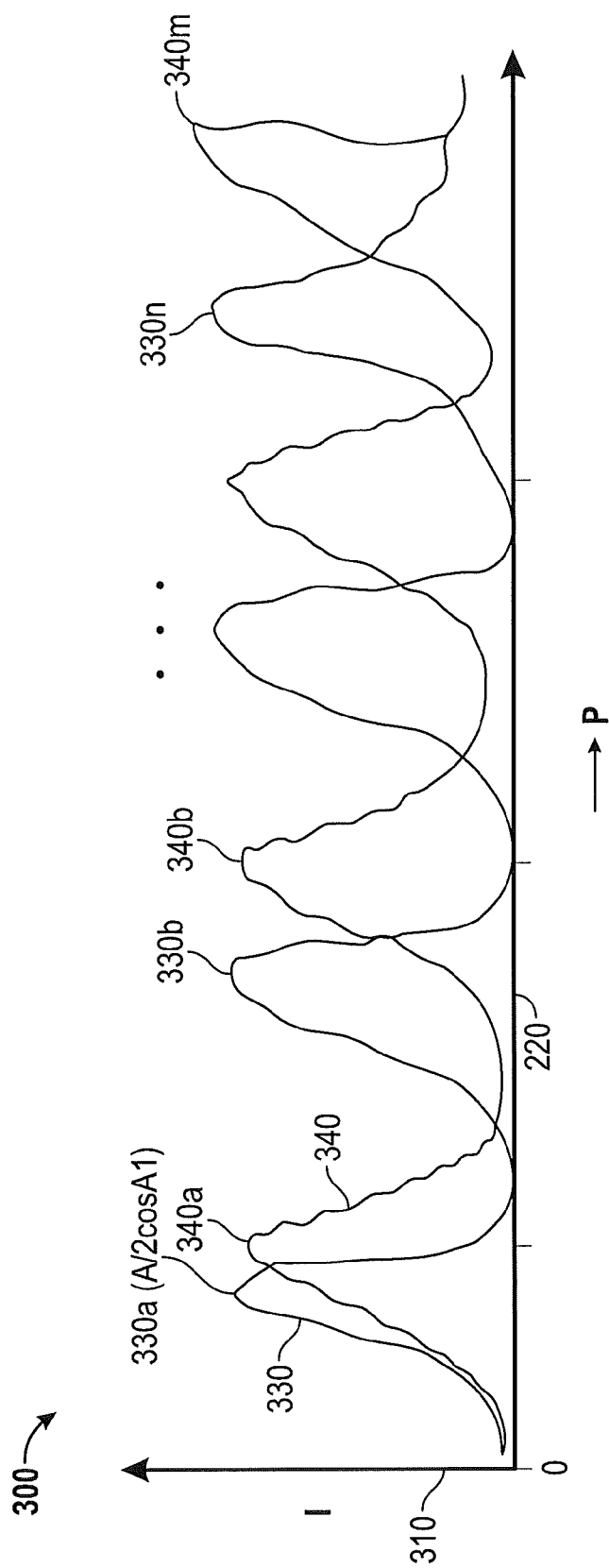
FIG. 3 shows a graph of current corresponding to light passing through the sensor shown in FIG. 1 at various pressures of a buoyant gas surrounding the sensor for a light beam directed at the sensor at a plurality of angles.

FIG. 3 shows an exemplary plot 300 of current versus pressure for two angles of incidents of light on the sensor 110. The current "I" is shown along the vertical axis 310 and pressure "P" is shown along the horizontal axis 320. Curve or plot 330 corresponds to current "I" for angle A1 and curve 340 corresponds to current for angle A2. An increase in the angle moves the curve to the right and a decrease in the angle moves the curve to the left. Using the spacing between the peaks of the fringes, such as peaks 330a, 330b through 330n, peaks 340a, 340b through 340n and peaks corresponding to other angles (not shown), the processor 162 determines the distance "D" between the partially reflective members 120 and 122. This distance "D" is determined in the wavelength units and is thus relatively accurate compared to traditional mechanical measurements. The distance "D" so measured, enables calibrating the sensor 110 for use in downhole and other application. In addition, from measurements corresponding to multiple angles, the order of fringes in the interferometer of sensor 110 may be determined. In general, the smaller the distance "D", the smaller the order of the fringes. Also, a relationship between fringes may be determined from measurements taken corresponding to multiple angles. For example, from a number of current curves, a mathematical relationship or an equation may be derived that provides a relationship between the fringes at various angles.

A method of estimating gravity of an optical sensor, such as sensor 110 shown in FIG. 1, is described below in reference to FIGS. 4-8. A proof-mass in a buoyant gas has an additional constant force on the proof-mass such that $$kx = mg - B, \quad (1)$$

where k is the spring constant, m is the mass of the proof-mass, x is the displacement of the proof-mass, g is the acceleration of gravity, and B is the buoyant force due the displacement of the gas by the proof-mass. Substituting for the density of the gas, $\rho_g$, and proof-mass, $\rho_m$, and the volume of the proof-mass, $V_m$ provides $$kx = \rho_m V_m g - \rho_g V_m g \quad (2)$$
$$= \rho_m V_m g \left(1 - \frac{\rho_g}{\rho_m}\right)$$
$$= mg\left(1 - \frac{\rho_g}{\rho_m}\right)$$
$$= mg_{\mathit{eff}}.$$

Equation 2 shows that the displacement of the proof-mass depends on an "effective" gravity. The ideal gas law is given by $$P = nRT, \quad (3)$$

where n is the number of moles per unit volume, in this instance $m^3$; R is the gas constant 8.32 J/K/mole and T is the temperature in Kelvins. Solving for the molar density from equation 3 provides $$n = \frac{P}{RT} \quad (4)$$

Multiplying by the molecular weight, M, in kg/mol, yields $$\rho_g = M_g n = \frac{M_g}{RT} P. \quad (5)$$

Assuming that the desired uncertainty of the effective gravity is 1 uGal, then we one can compute the accuracy needed for the pressure of the gas as $$\sigma_{\mathit{eff}}^2 = \sigma_P^2 \left(\frac{d}{dP} g_{\mathit{eff}}\right)^2. \quad (6)$$

$$\left(\frac{d}{dP} g_{\mathit{eff}}\right) = \frac{d}{dP} g\left(1 - \frac{\rho_g}{\rho_m}\right) = g\left(1 - \frac{1}{\rho_m} \frac{M_g}{RT} P\right) = -\frac{g}{\rho_m} \frac{M_g}{RT} \quad (7)$$

Therefore $$\sigma_{\mathit{eff}} = \sigma_P \left(\frac{g}{\rho_m} \frac{M_g}{RT}\right). \quad (8)$$

$$\frac{\sigma_{\mathit{eff}}}{g} = \sigma_P \left(\frac{1}{\rho_m} \frac{M_g}{RT}\right) \approx 10^{-9}. \quad (9)$$

$$\sigma_P \approx 10^{-9} \left(\frac{\rho_m RT}{M_g}\right). \quad (10)$$

$$\sigma_P \approx 10^{-9}(4.11 \times 10^8) \text{Pa} = 0.411 \text{Pa} = 6.0 \times 10^{-5} \text{lbs./in}^2 \quad (11)$$

The accuracy desired for the pressure and the temperature for some downhole applications is much greater than that of available normal pressure gauges. However, one can extract small signal calibration constants from an analysis of gravimeter data as described below.

Figure 4:
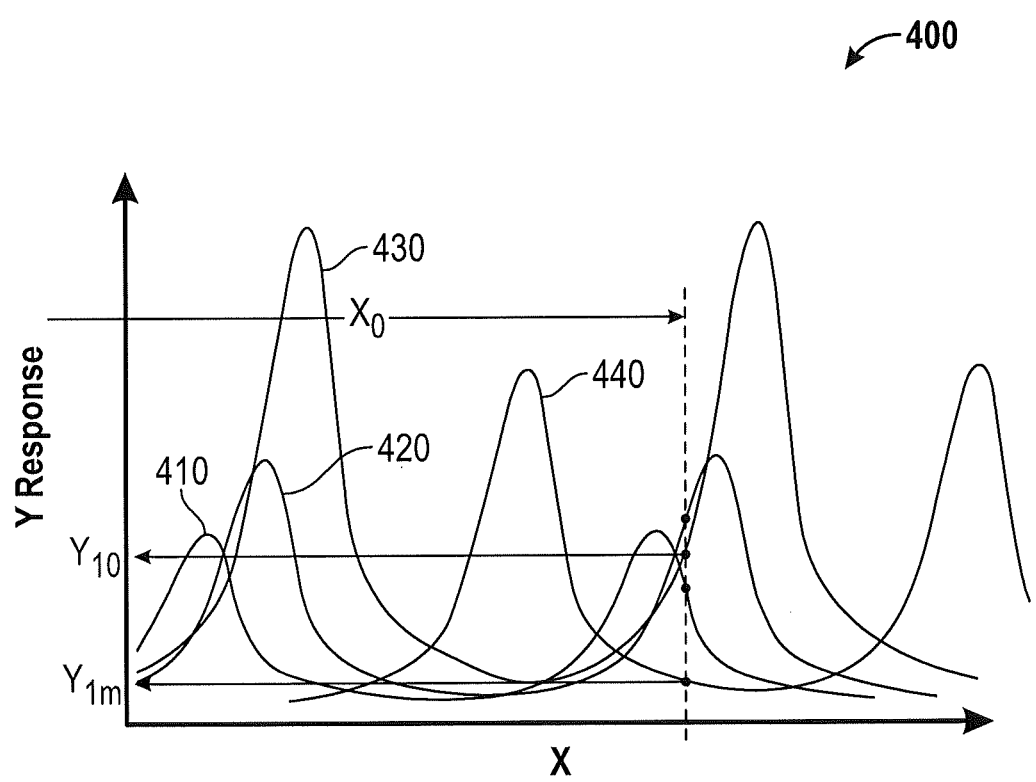
FIG. 4 shows an optical response of an optical gravimeter, such as shown in FIG. 1, wherein $X_0$ is the cavity length and Y is the response for each channel.
Figure 5:
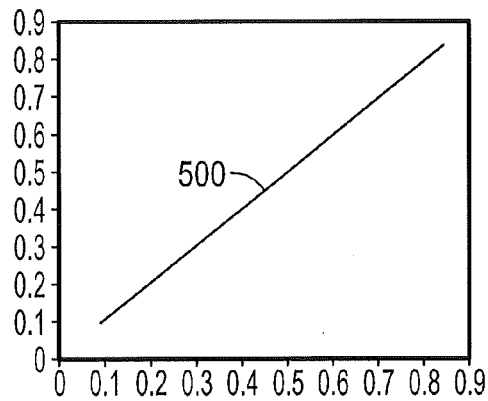
FIGS. 5-8 show responses for four exemplary channels plotted against one another.
Figure 6:
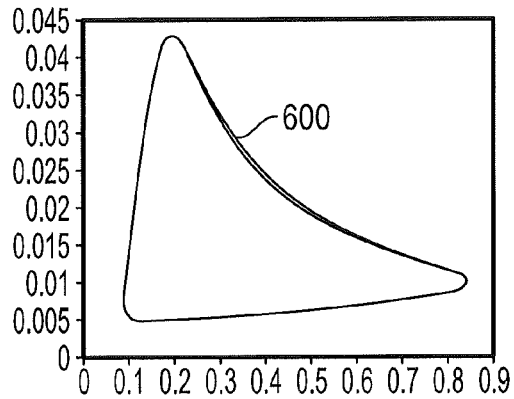
Figure 7:
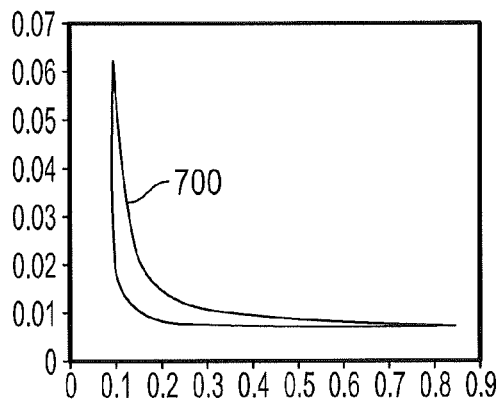
Figure 8:
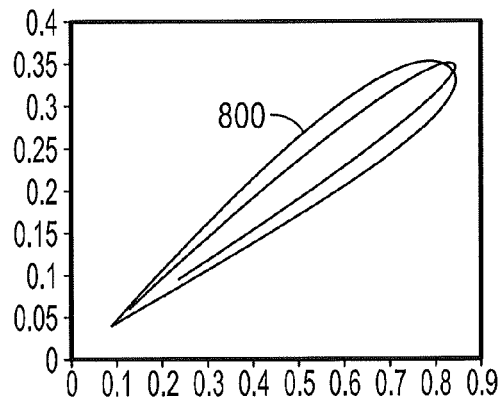

FIG. 4 shows an optical response of an optical gravimeter, such as shown in FIG. 1, wherein $X_0$ is the cavity length and Y is the response for each channel. The horizontal axis is cavity length X with a non-zero origin. The vertical axis Y is the response in arbitrary units and a zero origin. Curves 410, 420, 430 and 440 represent the response of different channels as a function of cavity length. Each channel can have different amplitudes and different periods. Changing the pressure of the gas does two things: (1) It changes the buoyant force on the proof-mass; and (2) changes the index of refraction. Both effects cause the response of the light through the etalon gap "D" to change: one by changing the physical cavity length, and the other by changing the optical path length. The changes can be large enough (such as greater than half the wavelength of the incident light) to change the response by at least one period.

In the case of the divergent beam gravimeter, such as shown in FIG. 1, the responses shown in FIG. 4 may be represented by $$Y_m = \frac{A_m}{1 + F_m \sin^2(2\pi n X_0 \cos\theta_m / \lambda)}; \quad (12)$$

where, $A_m$ and $F_m$ are calibration constants that may vary slowly over many periods of the response, $\theta$ is the angle of incidence of the light in each channel, $\lambda$ is the wavelength of the incident light and n is the index or refraction of the material (gas) in the cavity, wherein n and $X_0$ appear as a product. If the product $nX_0$ is varied, then the period of each channel may be represented as $$\frac{\lambda}{2\cos\theta_m}. \quad (13)$$

FIGS. 5-8 show responses 500, 600, 700 and 800 for four channels plotted against one another. The maximum and minimum values can be used to calculate $A_m$ and $F_m$. The FIGS. 5-8 are not closed. This arises because the periods of each of the channels are different. As the pressure of the gas changes, one can plot the responses of the channels as a function of each other. FIGS. 5-8 show graphs or plots 500, 600, 700 and 800 for four channels as the response varies over slightly more than one period for all the channels. From left to right and top to bottom, the $m^{th}$ channel is plotted against channel 1. The maximum and minimum values can be used to calculate calibration constants $A_m$ and $F_m$. FIGS. 5-8 are not closed because each of the channels has a slightly different period. Graph 800 shows that channel four is nearly in-phase with channel one. Graph 700 is an example of a nearly out-of-phase response, and graph 600 represents an intermediate phase. If $Y_{max}$ and $Y_{min}$ represent the maximum and minimum of a channel's response, then the calibration constants of a channel are given by $$A = Y_{max}; \quad (14)$$
$$F = \frac{Y_{max}}{Y_{min}} - 1.$$

Using the calibration constants, the model equation, eqn. (12), can be inverted to estimate the phases of each channel during a measurement. In one aspect, the measurement process may include: (1) making an initial measurement at ambient conditions; (2) admitting buoyant gas to the gravimeter etalon gap; (3) changing the pressure over a range while acquiring response data; (4) estimating the calibration constants from the data; (5) using the calibration constants to compute each channel's phase of the initial measurement; (6)

using the channel phases along with the channel periods to compute the size of the etalon gap; and (7) estimating the gravity from the etalon gap.

While the foregoing disclosure is directed to the embodiments of the disclosure, various modifications will be apparent to those skilled in the art. It is intended that all variations within the scope and spirit of the appended claims be embraced by the foregoing disclosure.

The invention claimed is:

1. An apparatus for determining a selected characteristic of a sensor, comprising:
a chamber containing the sensor that includes a suspended movable force mass having an opening therethrough, a first partially reflective member that moves with the force mass and a second partially reflective member spaced from the first partially reflective member;
a buoyant fluid supplied at a plurality of pressures in the chamber by a fluid source that changes the pressure of the fluid;
a light source for directing light to the first and second partially reflective members at a plurality of angles; and
a detector for providing signals corresponding to light passing through the second partially reflective member corresponding to each of the plurality of angles and each of the plurality of pressures; and
a processor for determining the characteristic of the sensor from the signals provided by the detector.

2. The apparatus of claim 1, wherein the buoyant fluid is Xenon.

3. The apparatus of claim 1, wherein increasing a pressure of the buoyant fluid reduces a gravity of the force mass within a range of 2% to 5%.

4. The apparatus of claim 1, wherein the fluid source supplies the fluid under pressure into the chamber.

5. The apparatus of claim 4, wherein the fluid source is selected from a group consisting of: a fluid supply tank and a pump; and a bellows containing the fluid and device for contracting the bellows.

6. The apparatus of claim 1, wherein the sensor provides measurements over gravity values that fall between 1 g to about 0.96 g.

7. The apparatus of claim 1 further comprising a pressure sensor and a temperature sensor for measuring the pressure and temperature of the fluid in the chamber while the detector is providing the signals.

8. The apparatus of claim 1, wherein density of the fluid in the chamber is between 2% and 5% of the density of the proof mass.

9. The apparatus of claim 1, wherein the processor determines peaks at a plurality of measurements and utilizes the peaks to determine the calibration of the gravimeter.

10. The apparatus of claim 1, wherein the processor determines peaks of fringes from the signals corresponding to each of the plurality of angles.

11. The apparatus of claim 10 wherein the processor determines distance between the first partially transparent member and the second partially transparent member from the signals.

12. The apparatus of claim 1 wherein the processor determines a fringe pattern from the signals.

13. A method of determining a selected characteristic of a sensor, comprising:
housing the sensor in a chamber, wherein the sensor includes a suspended movable force mass having an opening therethrough, a first partially reflective member that moves with the force mass and a second partially reflective member spaced from the first partially reflective member;
supplying a buoyant fluid at a plurality of pressures into the chamber;
directing light to the first and second partially reflective members at a plurality of angles; and
generating signals relating to light passing through the second partially reflective member corresponding to the plurality of angles and plurality of pressures; and
determining the characteristic of the sensor from the generated signals.

14. The method of claim 13, wherein supplying the buoyant fluid at a plurality of pressures comprises reducing gravity of the proof mass by up to 5%.

15. The method of claim 13 wherein the characteristic of the sensor is selected from a group consisting of: distance between the first partially reflective member and the second partially reflective member; order of fringes relating to light reflections between the first partially reflective member and the second partially reflective member; and distances between peaks of fringes.

16. The method of claim 15 further comprising calibrating the sensor using the determined distance.

17. The method of claim 13 further comprising maintaining density of the buoyant fluid in the chamber between 2% and 5% of the density of the proof mass.

18. The method of claim 13 further comprising determining distances between peaks of fringes from the signals corresponding to each of the plurality of angles.

19. The method of claim 13 further comprising:
estimating distance between the first partially reflective member and the second partially reflective member;
calibrating the sensor using the estimated distance; and
utilizing the sensor in a downhole tool to obtain measurements in a wellbore.

20. The method of claim 19, wherein the measurements in the wellbore relate to one selected from the group consisting of: gravity; and acceleration.

* * * * *